United States Patent Office 3,796,721
Patented Mar. 12, 1974

3,796,721
ETHYL 4-CARBOMETHOXY-2,2-DIMETHYL-
THIAZOLIDINE-3-THIOLOCARBOXYLATE
Morris Fishman, East Windsor, N.J., assignor to FMC
Corporation, New York, N.Y.
No Drawing. Filed Jan. 12, 1972, Ser. No. 217,293
Int. Cl. C07d 91/16
U.S. Cl. 260—306.7                                       1 Claim

ABSTRACT OF THE DISCLOSURE

Ethyl 4-carbomethoxy - 2,2 - dimethylthiazolidine - 3-thiolocarboxylate useful for controlling insect populations is described.

---

This invention relates to the control of insects, particularly by means of compounds having growth regulatory activity.

The use of chemicals for the purpose of controlling crop pests such as insects and other undesirable organisms is an established agricultural practice. The first chemical control agents were commonly inorganic substances of which copper arsenate, (Paris Green) mercury salts and lime/surfur are familiar examples. Some plant derived toxicants were known also e.g. pyrethrum and nicotine. However, as the demand arose for higher yields per acre, newer and more powerful chemicals were required to protect the vast stands of food crops from insect damage. This prompted extensive research efforts directed at finding even more potent agricultural chemicals finally culminating in the highly effective organic pesticides which are used in modern commercial farming.

The new generation pesticides, while superior to the materials used heretofore, did present certain disadvantages. For instance, the chlorinated hydrocarbon DDT proved exceptionally lethal but after being in use a few years, increasingly larger dosages were required to control a given insect population. Apparently, the insects had grown resistant. Subsequent investigations revealed that insects develop genetic resistance to pesticides making it more difficult to control succeeding generations. Although larger amounts of pesticide will kill the resistant strains, this means higher overhead with concomitant loss of farm income. Moreover, the massive application of pesticides, particularly the more persistant chlorinated hydrocarbons such as DDT, are being curtailed for ecological reasons.

In view of the foregoing, scientists are seeking more environmentally compatible pest control measures. One promising lead in this connection is based on control of the biochemical processes which regulate the life cycle of insects, particularly those processes involved with growth and development.

In its development from the egg, an insect undergoes a series of discrete physical transformations referred to as metamorphosis by entomologists. The first period, following hatching of the egg, is the worm or larval stage; then the resting or pupal stage, and finally the adult stage. Some classes of insects do not exhibit a pupal stage, the larvae passing directly into the adult form. During the larval stage, the insect growth is accompanied by distinct steps in which a new exoskeleton is formed and the old one shed in a process known as molting. It has been established that these processes, molting and metamorphosis, are regulated by substances known as molting hormone and juvenile hormone which are secreted by glandular cells of the insect. The presence of both hormones affords molting without metamorphosis; absence of juvenile hormone causes molting with metamorphosis to take place. Certain of these hormones have been isolated and identified. Excess juvenile hormone, when topically applied to larvae or pupae at a critical stage of development, is effective in preventing insect maturation. Excess molting hormone accelerates larvae through their life cycle to a premature death, but the substance must be injected to be effective.

Following the discovery of the juvenile hormone and its role in metamorphosis, considerable effort was made to adapt it for the control of insect population. Its principal advantage is that it does not present the toxicity hazard to mammals which characterizes many of the more conventional pesticides.

Due to the difficulties in isolating juvenile hormones in sizable quantities from natural sources, investigators have turned their efforts toward the production of synthetic products. Eventually, compounds were found which exhibited juvenile hormone activity and which were easier to obtain in quantity than the natural product. Such compounds are generally referred to as juvenile hormone mimics. Although promising for the control of certain insect pests, the substances suffer from the distadvantage that the larval stage of the insect is maintained or prolonged; in many cases this is the most destructive stage of insect life. Thus far, the juvenile hormone mimic compounds have not been produced commercially.

The surprising discovery has now been made that ethyl 4 - carbomethoxy-2,2-dimethylthiazolidine - 3 - thiolocarboxylate, a novel chemical compound, is capable of mimicking the molting hormone in that it causes acceleration of the larval life cycle of insects resulting in their premature pupation and/or death. Eggs from any surviving adults are less viable; larvae hatching from such eggs do not survive to maturity. The provision of such growth regulatory compound and its use in controlling insects constitutes the principal object and purpose of this invention.

In accordance with the invention, ethyl 4-carbomethoxy-2,2-dimethylthiazolidine-3-thiolocarboxylate is obtained by the following sequence of reactions.

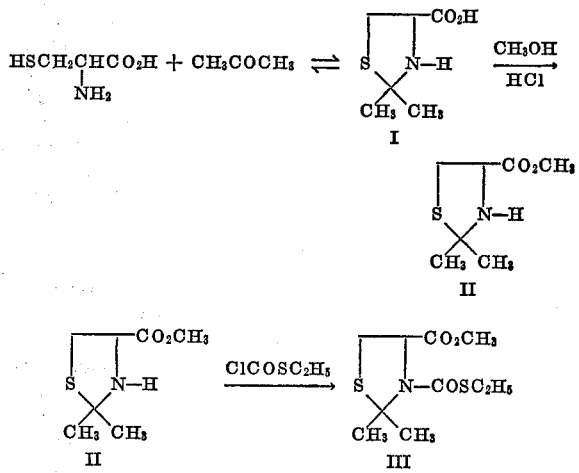

The condensation of cysteine with acetone to give the acid I is described in J. Amer. Chem. Soc., 59, 1690–1694 (1937). The Fisher esterification is a well-known ester synthesis and its application to the preparation of II is disclosed in J. Am. Chem. Soc., 80, 1158–1164 (1958). The acylation of methyl 2,2-dimethylthiazolidine-4-carboxylate with ethyl chlorothioformate to give the novel Compound III has not been described previously. Preparative details of the reactions aforesaid are provided in the following example in which melting and boiling points are in centigrade degrees.

EXAMPLE 1

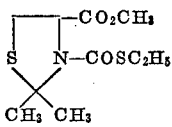

Ethyl 4-carbomethoxy-2,2-dimethylthiazolidine-3-thiolocarboxylate

Methyl 2,2-dimethylthiazolidine - 4 - carboxylate, B.P. 50°/0.05 mm. (3.30 g., 0.0189 mole) was dissolved in dry benzene (50 ml.) and cooled to 0° C. Triethylamine (3.30 ml.) was added followed by ethyl chlorothioformate (9.40 ml.) maintaining the temperature below 5°. After the addition was completed, the reaction mixture was stirred at room temperature for 24 hrs. The precipitate of triethylamine hydrochloride was filtered off and the filtrate evaporated in vacuo to an oil. Column chromatography of the oil using 100 g. of silica gel and elution with 10% ether-hexane afford 3.49 g. (70%) of ethyl 4-carbomethoxy-2,2-dimethylthiazolidine-3 - thiolocarboxylate.

*Analysis.*—Calcd. for $C_{10}H_{17}NO_3S_2$ (percent): C, 45.62; H, 6.46. Found (percent): C, 45.80; H, 6.31.

The IR, NMR and mass spectra were in agreement with the proposed structure.

A solution of 2,2-dimethylthiazolidine-4-carboxylic acid (22.92 g., 0.014 mole) in anhydrous methanol (500 ml.), which had been saturated with anhydrous hydrogen chloride, was stored at room temperature for 8 hrs. and at 0–5° overnight. Removal of solvent under reduced pressure gave a crystalline residue which was dissolved in a minimum amount of water (25 ml.). The solution was covered with ether (75 ml.), and sodium carbonate was added in small portions until $CO_2$ evolution had ceased (pH 8). The mixture was filtered, the ether layer separated, and the aqueous layer extracted three times with ether. The combined ether layers were dried over anhydrous $MgSO_4$, filtered, and evaporated to dryness. Vacuum distillation of the residue yielded 17.92 g. (72%) of product as a water white liquid, B.P. 50°/0.05 mm.

Free L-cysteine (20 g., 0.166 mole) was refluxed in dry acetone (5 l.) for 1.25 hrs. After cooling, a small amount of undissolved material was removed by filtration. The filtrate was concentrated to 300 ml. and was allowed to stand in the refrigerator overnight. A solid appeared and was filtered giving 20 g. (75%) of white crystals, M.P. 138–139°.

As above pointed out, the ethyl 4-carbomethoxy-2,2-dimethylthiazolidine-3-thiolocarboxylate herein causes the hastening of the larval stage resulting in premature pupation of insects. The compound functions as a growth regulant and thus acts diametrically opposite to the juvenile hormones which prolong the larval stage. Such disruption in the maturation process is an effective insect control method since the destructive larval stage is significantly shortened. Eggs from any surviving adults are less viable while larvae hatching from such eggs do not attain maturity.

The compound of the invention is active on contact with or ingested by susceptible forms of the insects. Typically, compositions containing the active compound in effective amounts are applied to an insect environment from which it transfers to the insect thereby preventing normal maturation. The degree of effectiveness of the compound of the invention depends on its concentration in the environment and the amount absorbed therefrom. Efficiency is measured by the suppression of adult development or of population growth. Susceptible forms can include larvae, pupae, or adults.

Excellent results are achieved against such typical pest organisms as *Tribolium confusum* (confused flower beetle), *Tenebrio molitor* (yellow mealworm), *Musca domestica* (housefly), and the like.

The compound of the invention is conveniently applied as emulsions, suspensions, solutions, dusts, and aerosol sprays. Such formulations commonly contain, in addition to the active compounds, ancillary ingredients normally found in pesticide preparations. Moreover, the compound herein can be used either alone as the sole component or in admixture with other pesticidal agents. The pesticide compositions of the invention can contain as adjuvants, organic solvents such as vegetable oils, petroleum, etc.; water; emulsifying agents; surface active agents; talc; pyrophyllite; diatomite; gypsum; clays; propellants such as dichlorodifluoromethane and the like. In some instances, it may be desirable to apply the compound herein directly to feedstuffs, seeds, etc., upon which insect pests feed. Another mode of application for using the compound herein is to apply it in formulations which are not active as such, but are rendered active by sequent means such as humidity, or by utilizing some physiological action which occurs after the compound is ingested or otherwise absorbed into the body of the pest organism.

Those skilled in the art will be aware of the manner in which the insectidal compositions of the invention are used. In general, the active agent will be embodied in the form of a liquid composition such as an emulsion, suspension or aerosol spray. While the concentration of the active component in the compositions herein can vary over rather wide limits, ordinarily it will comprise not more than about 1% to about 15% by weight of the composition. Preferably, the pesticide compositions will be in the form of solutions or suspensions containing about 1.0% of the active ingredient.

Test procedures

Topical testing screens.—This procedure is used with *Tenebrio molitor* larvae and *Musca domestica* larvae (see Table I). The test material (10 mg.) is weighed and to this is added 1.0 ml. of 9:1 acetone-squalene solution yielding a test solution with a concentration of 10 $\mu g./\mu l$. Further dilutions are obtained on a volume/volume basis. The desired concentrations are applied topically to the insects which are then held to observe the effects.

Media testing screens.—This procedure is used with *Tenebrio molitor* larvae, and *Tribolium confusum* larvae (see Examples 5–6). The insect diet (100 g.) is slurried in ether and to this is added 10.0 mg. of the test material dissolved in ether. The mixture is stirred and then the ether is removed in vacuo yielding the treated media. Dilutions are done on a weight/weight basis. The test insects are then placed in the desired media concentrations and held for observation and results.

EXAMPLE 2

*Musca domestica* (L.) screen

Ten larvae of the common housefly, *Musca domestica* (L.) were used in each assay. The test material was applied topically and the tests and controls held at 30° C. and 50% relative humidity. The first noticeable effect was a hastening of the life cycle, causing the test larvae to pupate approximately 12 hrs. before the control. Adults never emerged following this premature pupation.

Similar results were obtained with *Tenebrio molitor* larvae in topical testing (see Table I).

EXAMPLE 3

*Periplaneta americana* (L.) screen

Seven sixth instar nymphs of the American cockroach, *Periplaneta americana*, were used in each assay. The food media was treated to obtain the desired concentration of test material (100 p.p.m.) and placed in the test containers along with a supply of water. The control and test insects were held at 30° C. and 50% relative humidity. The tests were observed daily and checked for adequate food and water supply weakly. The first noticeable effect of the compound was a quickening of the immature nymphal period of the life cycle to the adult stage while the control colony was still in the nymphal stages. Once the cockroaches reached the adult stage, numerous egg sacs were formed and dropped; only 10% of these sacs yielded viable eggs. As the new nymphs began their maturation and growth, it was observed that the early nymphal stages were much shorter than normal; the nymphs all died before reaching the adult stage.

EXAMPLE 4

*Blatella germanica* (L.) screen

Five egg sac bearing females and two males of the German cockroach, *Blattella germanica*, were used in each assay. The food media was treated to obtain the desired concentration of test material (100 p.p.m.) and placed in the test containers along with a supply of water. The control and test insects were held at 30° C. and 50% relative humidity. The tests were observed daily and checked for adequate food and water supply weekly. The first noticeable effect observed in these tests was that of an ovicide, forcing premature dropping of the egg sacs yielding very few viable eggs. Those eggs that were viable yield nymphs with shortened early instars; all nymphs ultimately died.

EXAMPLE 5

*Tenebrio molitor* (L.) screen

Twenty-five sixth instar larvae of the yellow mealworm, *Tenebrio molitor*, were used in each assay. The food media was treated to obtain the desired concentration of test material (100 p.p.m.) and the larvae were placed in the media. In the first six weeks of testing, the larvae in the treated media progressed to the pupal stage at a hastened pace with a 50% killoff in the larvae at the end of week three and the remainder dying at week six in the pupal stage. The control was held for an additional six weeks at which time the larvae had reached the adult stage. Thus the hastened pace of growth can be attributed to the compound.

EXAMPLE 6

*Tribolium confusum* screen

Twenty-five larvae (approx. 4th instar) of the confused flower beetle. *Tribolium confusum*, were used in each test. The media was treated to obtain the desired concentration of test material (100 p.p.m.) and the larvae were placed in the media. The first noticeable effect was the hastening of the larval life cycle to the adult stage. The adults laid viable eggs and died shortly after. The eggs hatched and the new larvae also were hastened through their life cycle and subsequently died before reaching the pupal stage.

TABLE I.—TOPICAL TESTING

| Species | Conc., µg./insect | Total insect larvae | Dead larvae | Dead pupae | Adults | Percent control |
|---|---|---|---|---|---|---|
| Housefly | 1 | 10 | 2 | 8 | 0 | 100 |
|  | 0.1 | 10 | 2 | 8 | 0 | 100 |
|  | 0.01 | 10 | 2 | 7 | 1 | 90 |
|  | 0.001 | 10 | 2 | 3 | 5 | 50 |
|  | Control | 10 | 0 | 0 | 10 | 0 |
| Mealworm | 10 | 10 | 5 | 3 | 2 | 80 |
|  | 1.0 | 10 | 8 | 0 | 2 | 80 |
|  | 0.1 | 10 | 7 | 0 | 3 | 70 |
|  | Control | 10 | 2 | 0 | 6 | 20 |

What is claimed is:

1. Ethyl 4-carbomethoxy - 2,2 - dimethylthiazolidine-3-thiolocarboxylate of the formula

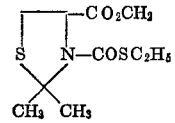

References Cited

UNITED STATES PATENTS 3,522,266   7/1970   Woodward _____ 260—306.7

OTHER REFERENCES

Boissonnas: Advances in Org. Chem., Methods and Results, vol. 3, Interscience, 1963, pp. 160–1.

RICHARD J. GALLAGHER, Primary Examiner

U.S. Cl. X.R.

424—270